US009959769B2

(12) United States Patent
Lee et al.

(10) Patent No.: US 9,959,769 B2
(45) Date of Patent: May 1, 2018

(54) APPARATUS AND METHOD FOR ASSISTING PARKING

(75) Inventors: Sang Yong Lee, Seoul (KR); Dae Seung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 217 days.

(21) Appl. No.: 14/350,245

(22) PCT Filed: Nov. 21, 2011

(86) PCT No.: PCT/KR2011/008860
§ 371 (c)(1),
(2), (4) Date: Apr. 7, 2014

(87) PCT Pub. No.: WO2013/051753
PCT Pub. Date: Apr. 11, 2013

(65) Prior Publication Data
US 2014/0285665 A1   Sep. 25, 2014

(30) Foreign Application Priority Data

Oct. 7, 2011   (KR) .......................... 10-2011-0102559

(51) Int. Cl.
*H04N 7/18*   (2006.01)
*G08G 1/16*   (2006.01)
(Continued)

(52) U.S. Cl.
CPC .............. *G08G 1/168* (2013.01); *B60R 1/00* (2013.01); *B62D 15/0295* (2013.01);
(Continued)

(58) Field of Classification Search
CPC ...................................... G08G 1/168
(Continued)

(56) References Cited

U.S. PATENT DOCUMENTS

| 2002/0003571 A1* | 1/2002 | Schofield | ................ B60C 23/00 |
| | | | 348/148 |
| 2002/0097170 A1* | 7/2002 | Yasui | ..................... G08G 1/166 |
| | | | 340/988 |
| 2011/0106380 A1* | 5/2011 | Wang | ........................ B60R 1/00 |
| | | | 701/36 |

FOREIGN PATENT DOCUMENTS

| JP | 2004-123057 A | 4/2004 |
| JP | 2005-306335 A | 11/2005 |

(Continued)

OTHER PUBLICATIONS

International Search Report in International Application No. PCT/KR2011/008860, filed Nov. 21, 2011.

*Primary Examiner* — Richard Torrente
(74) *Attorney, Agent, or Firm* — Saliwanchik, LLoyd & Eisenschenk

(57) ABSTRACT

The present invention relates to an apparatus and method for assisting parking, the apparatus including: an image sensor photographing front/rear view images of a vehicle; and an estimated trace of vehicle generation and process unit generating an estimated trace of the vehicle to a parking target area using steering angle information of the vehicle, and overlaying the estimated trace of the vehicle to the photographed front/rear view images of the vehicle, wherein the estimated trace of the vehicle includes a first estimated trace of the vehicle based on a rear wheel of the vehicle and a second estimated trace of the vehicle based on a front wheel of the vehicle.

7 Claims, 3 Drawing Sheets

(51) Int. Cl.
*B60R 1/00* (2006.01)
*B62D 15/02* (2006.01)

(52) U.S. Cl.
CPC ........ *H04N 7/181* (2013.01); *B60R 2300/305* (2013.01); *B60R 2300/806* (2013.01)

(58) Field of Classification Search
USPC .......................................................... 348/148
See application file for complete search history.

(56) References Cited

FOREIGN PATENT DOCUMENTS

| | | |
|---|---|---|
| JP | 2008-273495 A | 11/2008 |
| JP | 2010-076675 A | 4/2010 |

\* cited by examiner

[Fig. 1]
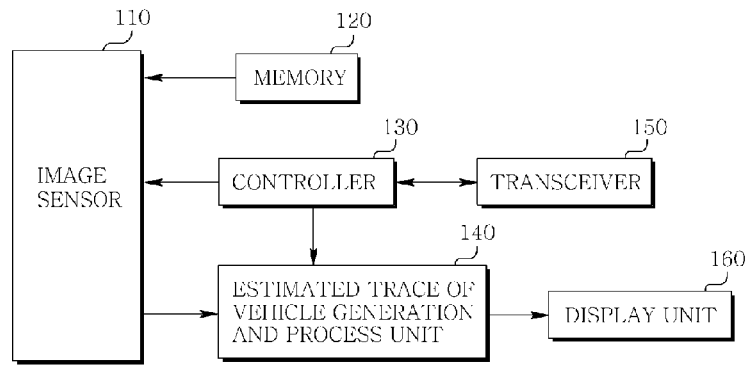
[Fig. 2]
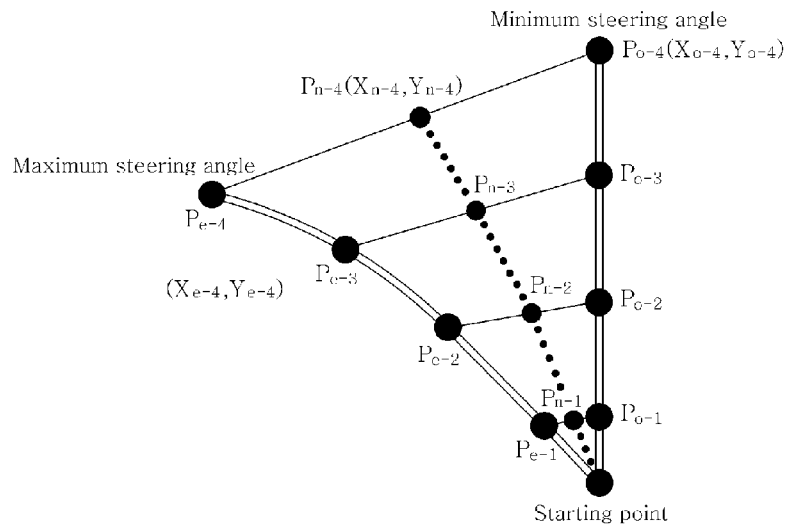
[Fig. 3]
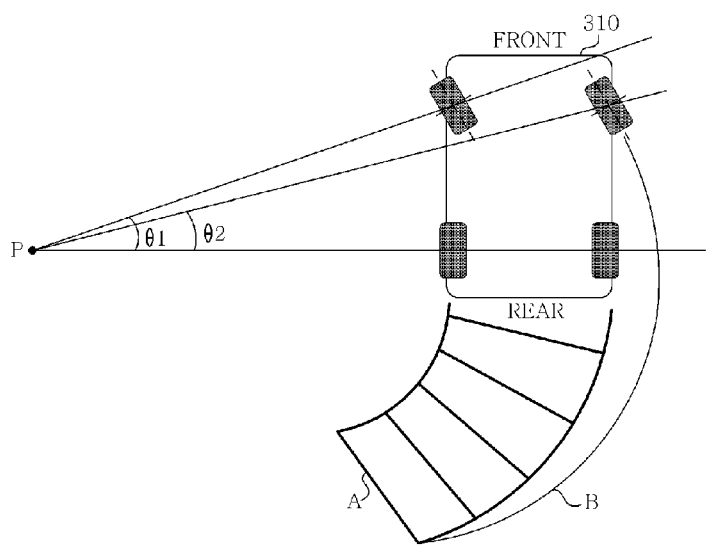

[Fig. 4]
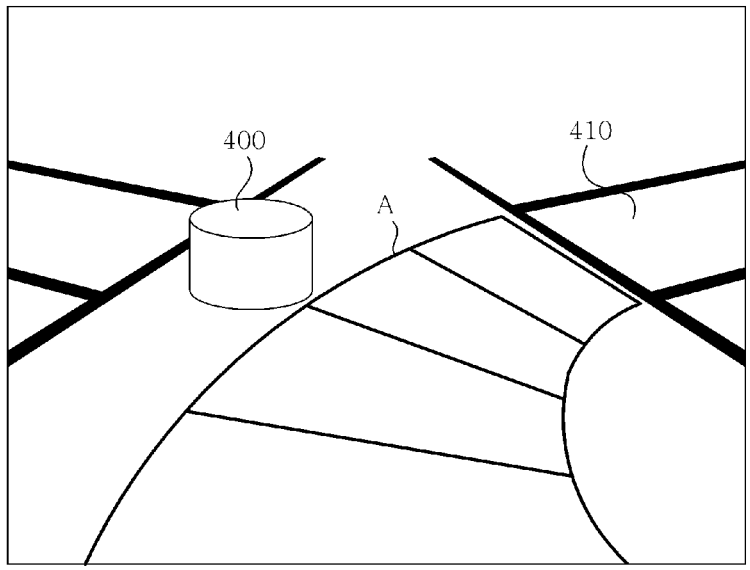
[Fig. 5]
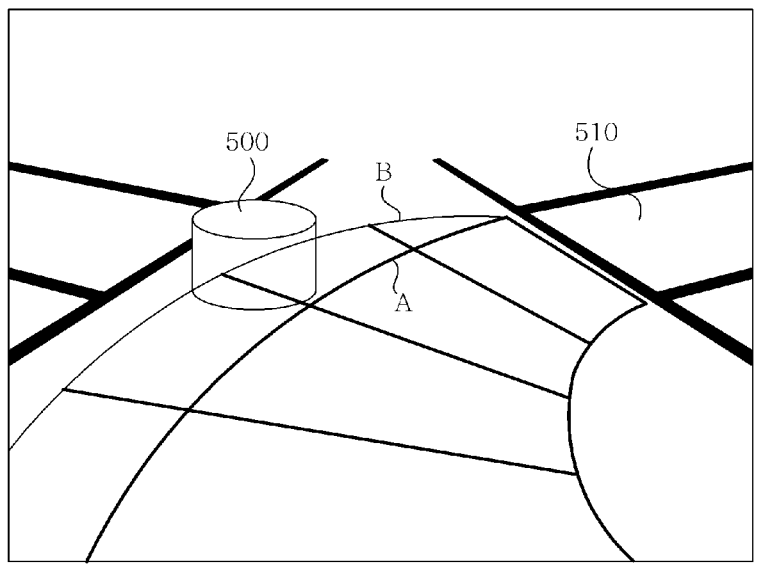

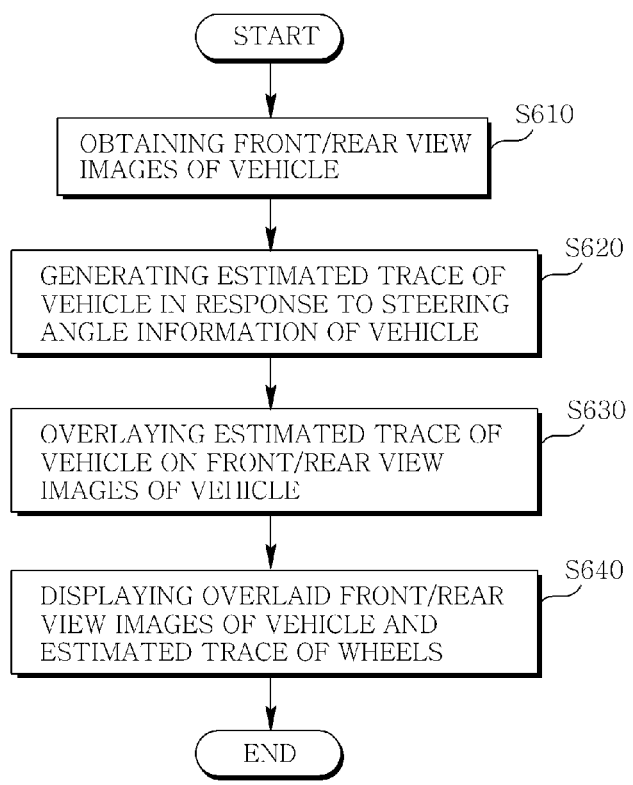
[Fig. 6]

APPARATUS AND METHOD FOR ASSISTING PARKING

CROSS-REFERENCE TO RELATED APPLICATIONS

This application is the U.S. national stage application of International Patent Application No. PCT/KR2011/008860, filed Nov. 21, 2011, which claims priority to Korean Application No. 10-2011-0102559, filed Oct. 7, 2011, the disclosures of each of which are incorporated herein by reference in their entirety.

TECHNICAL FIELD

The teachings in accordance with the exemplary embodiments of this invention relate generally to an apparatus and method for assisting parking, and more particularly to an apparatus and method for assisting parking using a rear or front view camera and a distance measuring sensor in a vehicle.

BACKGROUND ART

Recently, many devices have been developed to satisfy consumer demands and convenience with regard to power performance of a vehicle. As an example, front/rear view cameras for assisting parking, and an integrated display device for grasping status of a vehicle at a glance have been popularized. A driver can see obstacles using a display device and the distance measuring sensor mounted at front/rear sides of a vehicle when parking the vehicle, and can measure a distance to an obstacle.

Conventionally, in order to recognize an obstacle during parking, only limited information was provided in which a simple display of front/rear areas was displayed. As a measure to improve the conventional parking assisting system, a display device and method that is more intuitive and user-satisfying parking than the conventional one is badly needed.

DISCLOSURE OF INVENTION

Technical Problem

The present invention is directed to solve at least one or more of the aforementioned disadvantages/problems in whole or in part and to provide a display device and a method for assisting parking that is intuitive and capable of enhancing a user satisfaction.

Technical problems to be solved by the present invention are not restricted to the above-mentioned, and any other technical problems not mentioned so far will be clearly appreciated from the following description by skilled in the art.

Solution to Problem

An object of the invention is to overcome at least one or more of the above problems and/or disadvantages in whole or in part, and/or provide at least the advantages described hereinafter, and/or make improvements in the prior art. In order to achieve at least the above objects, in whole or in part, and in accordance with the purposes of the invention, as embodied and broadly described, and in one general aspect of the present invention, there is provided an apparatus for assisting parking, the apparatus characterized by: an image sensor photographing front/rear view images of a vehicle; and an estimated trace of vehicle generation and process unit generating an estimated trace of the vehicle to a parking target area using steering angle information of the vehicle, and overlaying the estimated trace of the vehicle to the photographed front/rear view images of the vehicle, wherein the estimated trace of the vehicle includes a first estimated trace of the vehicle based on a rear wheel of the vehicle and a second estimated trace of the vehicle based on a front wheel of the vehicle.

Preferably, the apparatus is further characterized by a display unit simultaneously displaying the overlaid front/rear view images of the vehicle and the estimated trace of the vehicle.

Preferably, the first and second estimated traces of the vehicle are updated real time in response to a steering angle of a steering wheel of the vehicle.

In another general aspect of the present invention, there is provided a method for assisting parking, the method characterized by: obtaining a front view image or a rear view image of a vehicle; generating an estimated trace of the vehicle in response to steering angle information of the vehicle; overlaying the estimated trace of the vehicle to the obtained front/rear view images of the vehicle; and simultaneously displaying the overlaid front/rear view images of the vehicle and the estimated trace of the vehicle, wherein the estimated trace of the vehicle includes a first estimated trace of the vehicle based on a rear wheel of the vehicle and a second estimated trace of the vehicle based on a front wheel of the vehicle.

Preferably, the first and second estimated traces of the vehicle are updated real time in response to a steering angle of a steering wheel of the vehicle.

Advantageous Effects of Invention

The automobile camera module according to the present invention has an advantageous effect in that an estimated trace of the vehicle including estimated traces of the rear wheel/front wheels is displayed to enable recognition of an obstacle on the displayed trace of the vehicle and to avoid the obstacle, in view of a chance that the conventional parking assisting technique was to display an estimated trace of the vehicle based only on a rear wheel, to insufficiently display an area in which a vehicle actually travels, and to cause an unexpected damage to a driver due to collision with an obstacle not existing on the estimated trace of the vehicle.

BRIEF DESCRIPTION OF DRAWINGS

The teachings of the present invention can be readily understood by considering the following detailed description in conjunction with the accompanying drawings, in which:

FIG. 1 is a block diagram illustrating an apparatus for assisting parking according to an exemplary embodiment of the present invention;

FIG. 2 is a conceptual diagram explaining a method for calculating a trace of a vehicle according to an exemplary embodiment of the present invention;

FIG. 3 is a schematic conceptual view illustrating an estimated trace of the vehicle by an apparatus and method for assisting parking according to an exemplary embodiment of the present invention;

FIG. 4 is a schematic view illustrating a displayed view by an apparatus and method for assisting parking according to prior art;

FIG. 5 is a schematic view illustrating a displayed view by an apparatus and method for assisting parking according to an exemplary embodiment of the present invention; and FIG. 6 is a flowchart illustrating a method for assisting parking according to an exemplary embodiment of the present invention.

BEST MODE FOR CARRYING OUT THE INVENTION

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description.

It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof may be used in the detailed description and/or the claims to denote non-exhaustive inclusion in a manner similar to the term "characterized by".

Furthermore, "exemplary" is merely meant to mean an example, rather than the best. It is also to be appreciated that features, layers and/or elements depicted herein are illustrated with particular dimensions and/or orientation relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

As used in the specification and in the claims, the singular form of "a", "an", and "the" include plural referents unless the context clearly dictates otherwise.

FIG. 1 is a block diagram illustrating an apparatus for assisting parking according to an exemplary embodiment of the present invention, where only essential elements are illustrated for easy understanding and explanation of the present invention.

An apparatus for assisting parking (hereinafter referred to as parking assisting apparatus) according to an exemplary embodiment of the present invention includes an image sensor (110) photographing front/rear view images of a vehicle; a memory (120) stored with data for assisting parking according to an exemplary embodiment of the present invention including a parking area indicating line of a vehicle and an estimated trace of the vehicle indicating line; an estimated trace of vehicle generation and process unit (140) generating an estimated trace of the vehicle to a parking target area using steering angle information of the vehicle, and overlaying the estimated trace of the vehicle to the photographed front/rear view images of the vehicle; and a controller (130) controlling operation of the estimated trace of vehicle generation and process unit (140) and receiving/processing data from an outside module including a steering angle sensor or from an outside unit.

The image sensor (110) may photograph front/rear view images of a vehicle when parking the vehicle, and synthesizing any one image of the data received from the memory (120), i.e., a parking area indicating line, a parking target area and a warning letter, with the front view image or rear view image of the vehicle. The memory (120) can transmit the stored data to the image sensor (110). The memory (120) may be a volatile memory or a non-volatile memory, and a flash memory, for example. The memory (120) may store images including a parking area indicating line, a parking target area and a warning letter.

The parking area indicating line among the images stored in the memory (120) may be changed based on a parking mode (parallel parking, right angle parking) or a parking direction (left or right direction).

The controller (130) may receive steering angle information and speed information of a vehicle in real time via a transceiver (150). The controller may be also connected to the image sensor (110) via 12C communication for data transmission and receipt. The controller (130) may transmit steering angle information received from the transceiver (150) to the estimated trace of the vehicle generation and process unit (140).

The estimated trace of vehicle generation and process unit (140) may use the received steering angle information to generate an estimated trace of a vehicle in response to the steering angle information. The estimated trace of vehicle generation and process unit (140) may respectively generate each estimated trace of the vehicle relative to a front wheel and a rear wheel of the vehicle. This is, in realizing the parking assisting apparatus and method, to prevent collision with an obstacle during parking by reducing an error between an actual trace of the vehicle and an estimated trace of the vehicle in consideration of the fact that a trace of the front wheel and a trace of the rear wheel are different.

Therefore, the estimated trace of vehicle generation and process unit (140) can generate an estimated trace of the vehicle including a first estimated trace of the vehicle based on a rear wheel of the vehicle and a second estimated trace of the vehicle based on a front wheel of the vehicle.

Generally, a plurality of coordinates is generated in a trace of a vehicle based on a trace of the vehicle of a maximum steering angle (e.g., 540° or 720°) and a trace of the vehicle of a minimum steering angle in consideration of characteristic of a vehicle when a rear or front view camera is turned on. Thereafter, the estimated trace of vehicle generation and process unit (140) receives the steering angle information of the vehicle in real time via CAN (Controller Area Network) communication to calculate an estimated trace of the vehicle in proportion to the minimum steering angle and maximum steering angle, connects each coordinate and generates the estimated trace of the vehicle. Explanation thereto will be provided in detail with reference to FIG. 2.

FIG. 2 is a conceptual diagram explaining a method for calculating a trajectory of a vehicle according to an exemplary embodiment of the present invention.

The estimated travel trajectory of a vehicle is such that a plurality of coordinates is generated in a travel trajectory based on a travel trajectory (a travel trajectory when a steering wheel is maximally turned) of a maximum steering angle (e.g., 540° or 720°) and a travel trajectory (a linear travel trajectory when a steering wheel is not turned) of a minimum steering angle in consideration of characteristic of a vehicle when a rear or front view camera is turned on.

For example, in a case a driver turns a steering wheel to a predetermined steering angle between the maximum steering angle and the minimum steering angle, coordinates of 'Pn-1', 'Pn-2', 'Pn-3' and 'Pn-4' can be calculated based on the predetermined steering angle as shown in FIG. 2, and dotted lines connected with these coordinates become the estimated travel trajectory.

At this time, the transceiver (150) may be configured to directly receive the steering angle information from a steering angle measuring device including a steering angle sensor, or to receive the steering angle information from a device or a module mounted on the vehicle capable of receiving the steering angle information.

Furthermore, the steering angle sensor measures a steering angle of a steering wheel necessary for control of a traveling vehicle. Thereafter, the transceiver (150) according to an exemplary embodiment of the present invention receives the steering angle information in real time via CAN communication and transmits the information to the controller, and the estimated travel trajectory generation and process unit (140) calculates coordinates of steering angle information received from the controller in proportion to the minimum steering angle and maximum steering angle, connects each coordinate and generates the estimated travel trajectory.

To be more specific, an X coordinate and a Y coordinate of the estimated travel trajectory may be determined by the following Equations 1 and 2, where a parking finish point of Pn-4 is exemplified.

$$Xn\text{-}4 = X0\text{-}4 - \Delta x \quad \text{[Equation 1]}$$

$$Yn\text{-}4 = Y0\text{-}4 - \Delta y \quad \text{[Equation 2]}$$

where, a variation rate ($\Delta x$) of X coordinate is (X0-4-Xe-4)/($\theta c/\theta m$), and a variation rate ($\Delta y$) of Y coordinate is (Y0-4-Ye-4)/($\theta c/\theta m$)(where, $\theta m$ is a maximum steering angle and $\theta c$ is a current steering angle).

FIG. 3 is a schematic conceptual view illustrating an estimated trace of a vehicle by an apparatus and method for assisting parking according to an exemplary embodiment of the present invention, where a point (P) illustrates a central point of a turning radius of a vehicle (310), $\theta 1$ defines an angle of a front left wheel of the vehicle (310) about the point (P), and $\theta 2$ means an angle of a front right wheel of the vehicle (310) about the point (P).

A wheel forming a large circle about the point (P) among front wheels of the vehicle is selected and an estimated trajectory of the wheel may be calculated using the method explained with reference to FIG. 2.

A first estimated trace of the vehicle (A) shows an estimated trace of a rear wheel of the vehicle (310), and a second estimated trace of the vehicle (B) shows an estimated trace of a front wheel of the vehicle (310). The first estimated trace of the vehicle (A) is an estimated trace of the vehicle based on the rear wheel of the vehicle (310), and may be displayed as a square applied with a perspective used in the general parking assisting device.

In case of using only the first estimated trace of the vehicle (A) based on the rear wheel of the vehicle (310), it is difficult to estimate collision with an obstacle present at a right rear side of the vehicle. In this case, drivers may be forced to slowly steer the vehicle and to directly and visually check whether the vehicle has actually collided with the obstacle using a display unit displaying a front or a rear view image of the vehicle in the vehicle and side view mirrors.

Thus, the parking assisting apparatus and method according to exemplary embodiment of the present invention is such that the second estimated trace of the vehicle (B) based on the estimated trace of the front wheel of the vehicle (310) is additionally mounted to allow the driver to recognize in advance a collision possibility with an obstacle through the display unit inside the vehicle, whereby collision with the obstacle can be prevented in advance.

As illustrated in FIG. 3, the parking assisting apparatus and method according to exemplary embodiment of the present invention can simultaneously display the first estimated trace of the vehicle (A) and the second estimated trace of the vehicle (B) and provide the first estimated trace of the vehicle (A) and the second estimated trace of the vehicle (B) to the driver.

Thus, the parking assisting apparatus and method according to exemplary embodiment of the present invention can provide estimated traces of the vehicle based on front wheels and rear wheels, whereby an error with an actual trace of the vehicle can be reduced to avoid collision with an obstacle.

FIG. 4 is a schematic view illustrating a displayed view by an apparatus and method for assisting parking according to prior art.

In a case a driver steers a steering wheel to reach a parking target area (410), the first estimated trace of the vehicle (A) may be displayed on the display unit.

As noted from FIG. 4, in a case only the first estimated trace of the vehicle (A) based on rear wheels of a vehicle (not shown) is displayed, the driver cannot easily determine through the display unit whether the vehicle has collided with an obstacle (400).

FIG. 5 is a schematic view illustrating a displayed view by an apparatus and method for assisting parking according to an exemplary embodiment of the present invention; and In a case a driver steers a steering wheel to reach a parking target area (510), the first estimated trace of the vehicle (A) may be displayed on the display unit. Furthermore, the second estimated trace of the vehicle (B) may be concurrently displayed on the display unit. The second estimated trace of the vehicle (B) calculates an estimated trace of the vehicle of a front wheel of a vehicle, and in this case, the driver can recognize a collision possibility with an object (500) located at the rear of the vehicle.

As illustrated in FIG. 5, in a case the first estimated trace of the vehicle (A) and the second estimated trace of the vehicle (B) are concurrently displayed, the driver can easily determine whether the vehicle has collided with the obstacle (500) via a screen on the display unit.

In addition, in a case an obstacle detected on the first estimated trace of the vehicle (A) or the second estimated trace of the vehicle (B) is present, the first estimated trace of the vehicle (A) or the second estimated trace of the vehicle (B) may be displayed in a mutually different color, or may be advised to the driver using blinking visual means. A warning letter may be simultaneously outputted to further attract the driver.

MODE FOR THE INVENTION

FIG. 6 is a flowchart illustrating a method for assisting parking according to an exemplary embodiment of the present invention.

The parking assisting method according to an exemplary embodiment of the present invention may include the steps of: obtaining a front view image or a rear image of a vehicle (S610); generating an estimated trace of the vehicle in response to steering angle information of the vehicle (S620); overlaying the estimated trace of the vehicle to the obtained front/rear view images of the vehicle (S630); and simultaneously displaying the overlaid front/rear view images of the vehicle and the estimated trace of the vehicle (S640), wherein the estimated trace of the vehicle may include a first estimated trace of the vehicle based on a rear wheel of the vehicle and a second estimated trace of the vehicle based on a front wheel of the vehicle.

The step of S610 is to photograph a front or rear view image of a vehicle using a camera or a camera module mounted on the vehicle, and to be more specific, an image sensor can obtain the front or rear view image of the vehicle.

The step of S620 is to receive steering angle information from a steering angle sensor to generate an estimated trace of the vehicle. The step of S620 can generate a first estimated trace of the vehicle based on front wheels of a vehicle and a second estimated trace of the vehicle based on front wheels of a vehicle.

The first and second estimated traces of the vehicle thus obtained can be overlaid on the front or rear view images of the vehicle obtained in the step of S610 (S630).

Furthermore, the step of S640 is to display the overlaid scene of the estimated traces of the vehicle with the front or rear view image of the vehicle.

The conventional apparatus and method using estimated traces of the vehicle provide only an estimated trace of a rear wheels of the vehicle, or only a single estimated trace of the vehicle, such that an effect of preventing collision with an obstacle was meager, and an error of an actual trace of the vehicle was present to reduce a reliability as a parking assisting function.

INDUSTRIAL APPLICABILITY

The parking assisting apparatus and method according to exemplary embodiment of the present invention has industrial applicability in that an estimated trace of the vehicle including rear wheel/front wheel estimated traces is provided through a display unit to reduce an error with an actual trace of the vehicle and to increase reliability of the parking assisting function, whereby collision with an obstacle can be prevented in advance.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

The invention claimed is:

1. An apparatus for assisting parking, the apparatus comprising:
    an image sensor that photographs front/rear view images of a vehicle; and an estimated trace of vehicle generation and process unit that generates estimated traces of the vehicle to a parking target area based on steering angle information of the vehicle and overlays the estimated traces of the vehicle to the photographed front/rear view images of the vehicle, wherein the estimated traces of the vehicle include a first estimated trace of the vehicle formed by a first estimated trajectory of an inner rear wheel of the vehicle and a second estimated trajectory of an outer rear wheel of the vehicle and a second estimated trace of the vehicle formed by a third estimated trajectory of an inner front wheel of the vehicle and a fourth estimated trajectory of an outer front wheel of the vehicle; and
    wherein the estimated trace of vehicle generation and process unit receives the steering angle information of the vehicle in real time through a communication network, calculates in real time estimated coordinates of the steering angle information of the vehicle in proportion to minimum steering angle and maximum steering angle, connects each coordinate, and generates the estimated traces of the vehicle.

2. The apparatus of claim 1, further comprising a display unit simultaneously displaying the overlaid front/rear view images of the vehicle and the estimated traces of the vehicle.

3. The apparatus of claim 1, wherein the first and second estimated traces of the vehicle are updated in real time in response to a steering angle of the vehicle.

4. The apparatus of claim 1, wherein the first estimated trace of the vehicle or the second estimated trace of the vehicle is displayed in mutually different colors, when an obstacle is detected based on the first estimated trace of the vehicle or the second estimated trace of the vehicle.

5. The apparatus of claim 1, wherein the first estimated trace of the vehicle or the second estimated trace of the vehicle is displayed to blink, when an obstacle is detected based on the first estimated trace of the vehicle or the second estimated trace of the vehicle.

6. A method for assisting parking, the method comprising:
    obtaining a front view image or a rear view image of a vehicle;
    generating estimated traces of the vehicle in response to steering angle information of the vehicle;
    overlaying the estimated traces of the vehicle to the obtained front view image or rear view image of the vehicle;
    and simultaneously displaying the overlaid front/rear view images of the vehicle and the estimated traces of the vehicle, wherein the estimated traces of the vehicle include a first estimated trace of the vehicle formed by a first estimated trajectory of an inner rear wheel of the vehicle and a second estimated trajectory of an outer rear wheel of the vehicle and a second estimated trace of the vehicle formed by a third estimated trajectory of an inner front wheel of the vehicle and a fourth estimated trajectory of an outer front wheel of the vehicle; and
    wherein the generating estimated traces of the vehicle comprises receiving the steering angle information of the vehicle in real time through a communication network, calculating in real time estimated coordinates of the steering angle information of the vehicle in proportion to minimum steering angle and maximum steering angle, connecting each coordinate, and generating the estimated traces of the vehicle.

7. The method of claim 6, wherein the first and second estimated traces of the vehicle are updated in real time in response to a steering angle of the vehicle.

\* \* \* \* \*